May 13, 1952 H. NYGAARD 2,596,912
MULTIGAP MAGNETIC TRANSDUCER HEAD
Filed Aug. 13, 1948 2 SHEETS—SHEET 1
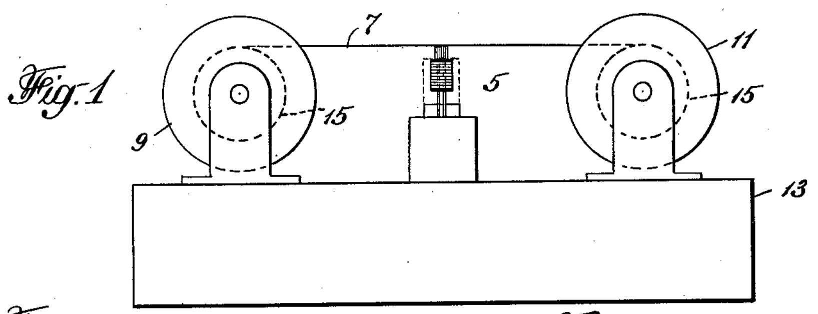
Fig. 1
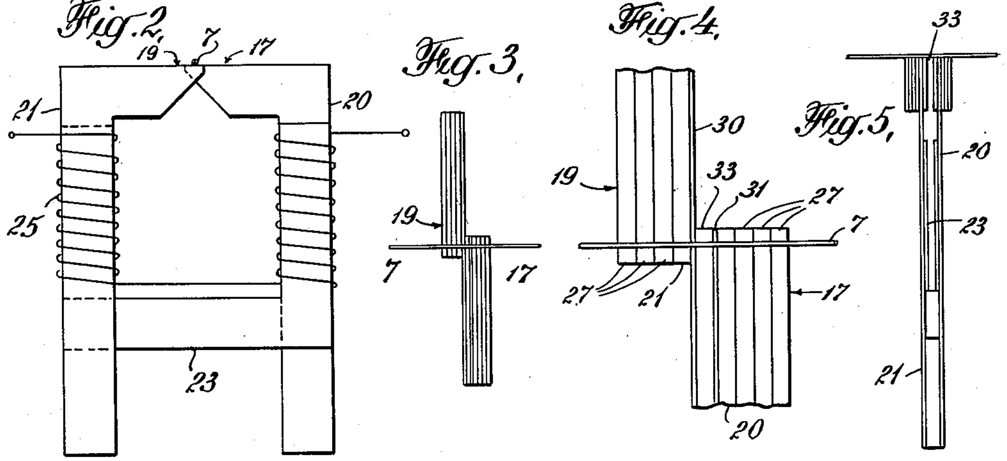
Fig. 2, Fig. 3, Fig. 4, Fig. 5,
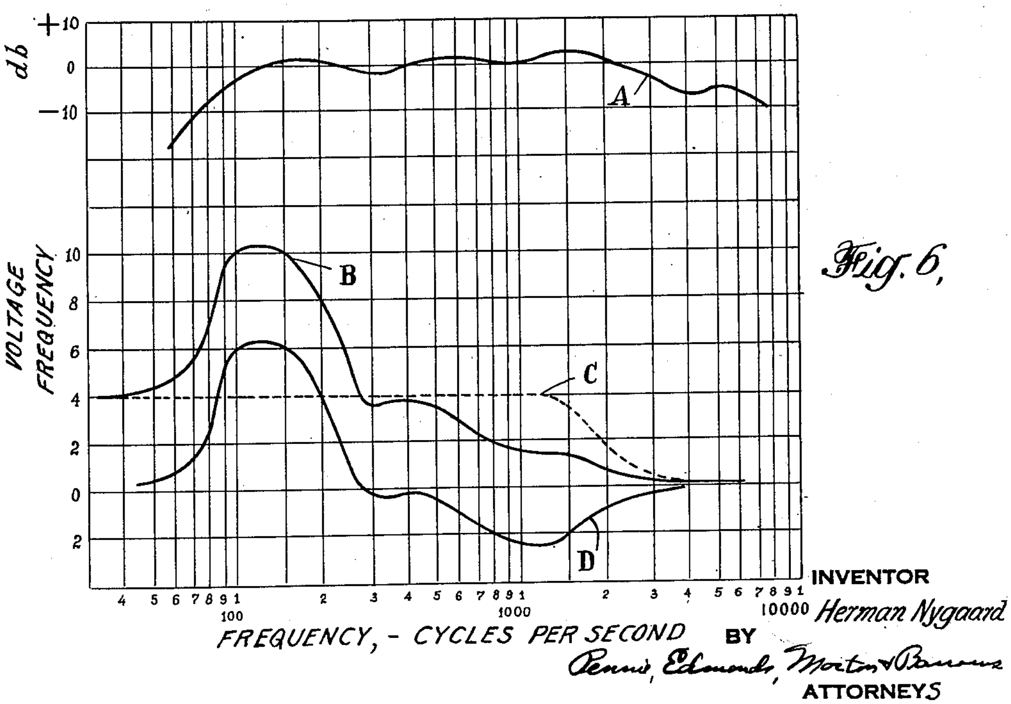
Fig. 6,
INVENTOR
Herman Nygaard
BY
Pennie, Edmonds, Morton & Barrows
ATTORNEYS May 13, 1952 H. NYGAARD 2,596,912
MULTIGAP MAGNETIC TRANSDUCER HEAD
Filed Aug. 13, 1948 2 SHEETS—SHEET 2
Fig. 7,
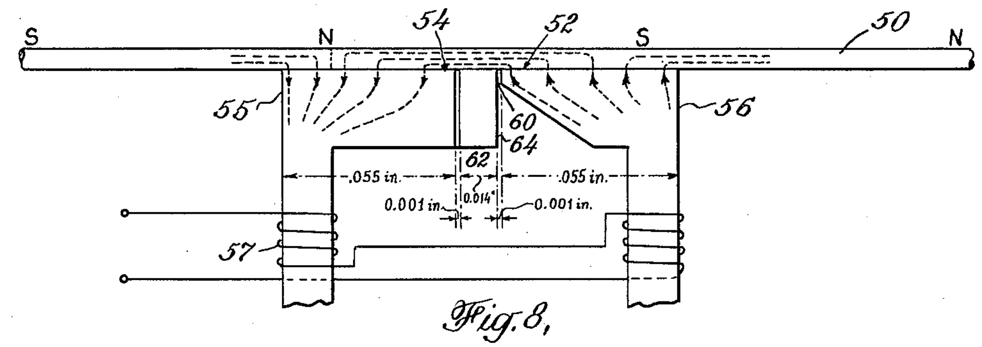
Fig. 8,
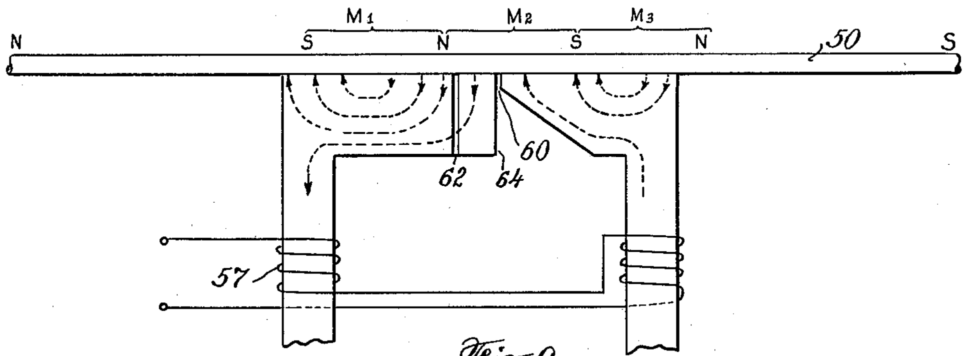
Fig. 9,
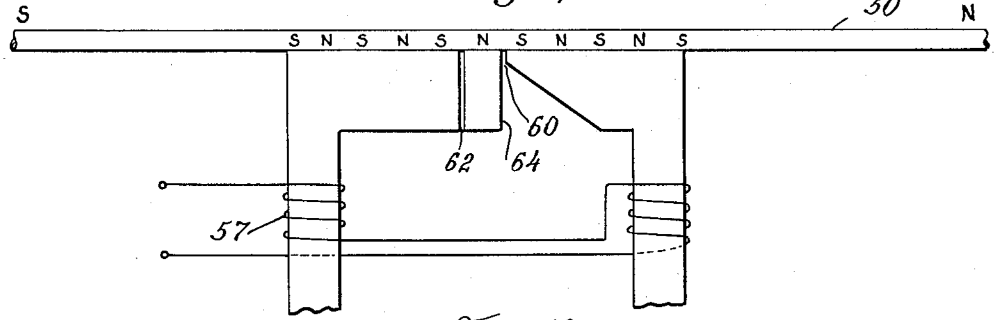
Fig. 10.
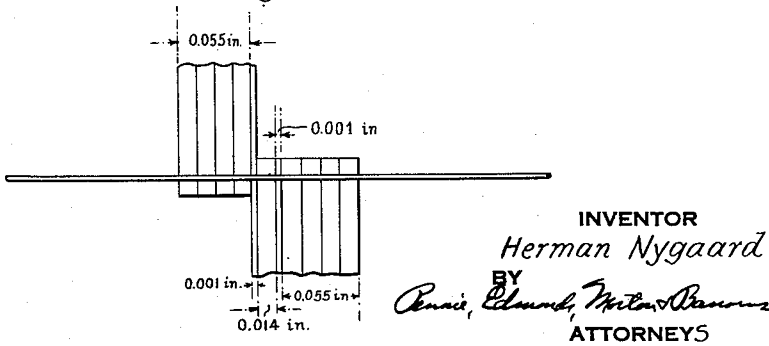
INVENTOR
Herman Nygaard
BY
Rennie, Edmonds, Morton & Barrows
ATTORNEYS Patented May 13, 1952 2,596,912

UNITED STATES PATENT OFFICE 2,596,912

MULTIGAP MAGNETIC TRANSDUCER HEAD

Herman Nygaard, Poughkeepsie, N. Y., assignor to Daystrom Electric Corporation, a corporation of Delaware Application August 13, 1948, Serial No. 44,174

5 Claims. (Cl. 179—100.2)

This invention relates to magnetic recording and more particularly to a magnetic recording system exhibiting an improved frequency response.

By the use of a new and improved form of magnetic head in conjunction with an appropriately chosen speed of movement for the record medium, there is achieved in the magnetic recording system of the present invention a greatly improved response on playback at the low frequencies and a flattening of the response in the middle audio frequencies.

It has been commonly assumed in the literature that, in accordance with Faraday's law relating the electromotive force induced in an electric circuit to the time rate of change of the flux lines linking it, the voltage induced in the pick-up coil of a magnetic playback head must, to a first approximation, be directly proportional to the frequency. This corresponds to the 6 db improvement in frequency response per octave of increasing frequency which is shown in the literature. At high frequencies other factors are believed to modify this relation, notably the so-called self-demagnetizing effect of the elementary magnets along the wire or tape and the growing size of the gap length in relation to the linear length of the recorded waves. At the low frequencies however, namely those below 1000 cycles, the traditional heads of the prior art have required additional amplification or "bass boost" on playback above the amount required in the middle range of frequencies.

The explanation of operation outlined above and the response curves which have been reported for typical prior art devices have assumed, as the magnetic heads involved indeed warranted, that the magnetic flux linking the coil of the pick-up head was obtained substantially entirely from the difference between the magnetomotive potentials existing immediately at the two sides of the gap. In the heads of the prior art the wire customarily makes contact with the pole pieces on either side of the gap for an unspecified but very small distance extending in either direction from the gap. With such a construction the only flux lines having a low-reluctance path from the wire into the head are those which can merge from the wire in the immediate vicinity of the gap on either side thereof.

I have devised a magnetic head and recording system in which the wire makes contact with the head for a substantial distance on either one or both sides of the gap. This provides on either side of the gap a relatively large area of contact between the wire and the material of the pole pieces. Over this entire area therefore the external flux lines due to the magnetization of the wire find a low reluctance path over which they can enter the iron of the pole tips and thread the pick-up coil so as to contribute to the voltage induced therein.

By properly dimensioning pole tips so as to adjust this contact area into a desired relation with the linear length occupied along the wire by recorded waves of frequencies which are preferred by the typical listener, I have produced a recording system in which the response on playback is very materially improved at the low frequencies.

In order further to flatten the response curve of the magnetic head with pole tips so dimensioned, I have provided in the magnetic circuit of my novel sound head a second or auxiliary nonmagnetic gap, closely spaced from the principal gap. The auxiliary gap reduces the peak customarily found in the middle audio frequencies in the frequency response curves of prior art sound heads.

My invention will now be described with reference to the accompanying drawings in which:

Fig. 1 is a schematic representation of a recording system according to my invention employing a wire or tape record medium;

Fig. 2 is a side elevation of a magnetic head according to my invention;

Fig. 3 is a plan view of the magnetic head of Fig. 2;

Fig. 4 is a partial enlarged plan view of the head of Fig. 2 in the region of the confronting pole tips where they are contacted by the wire;

Fig. 5 is an end elevation of the magnetic head of Fig. 2;

Fig. 6 is a graph showing the performance of a particular playback head built in accordance with my invention;

Fig. 7 shows the equivalent magnetic circuit of the head of Fig. 2 with applied dimensions of the particular head whose performance is shown in Fig. 6 and with illustration of a possible configuration of the lines of the magnetic flux during the playing back of a signal of 120 C. P. S. on the particular head whose performance is shown in Fig. 6;

Fig. 8 is a figure similar to that of Fig. 7 except that the signal being played back is of 300 C. P. S.;

Fig. 9 is a figure similar to that of Fig. 7 except that the signal being played back is of 1000 C. P. S., and Fig. 10 is a figure similar to that of Fig. 4 upon which are shown the important dimensions of the sound head whose performance is shown in Fig. 6.

Referring to Fig. 1, a recording system is shown including a recording and playback head 5 past which is continuously advanced a wire recording medium 7. The wire 7 is wound upon supply and take-up spools 9 and 11. The recording and playback head and the spools are supported from a chassis 13 which includes the driving mechanism for the spools and all necessary electrical equipment for transforming acoustical signals to electrical signals during recording and vice versa on playback. The supply and take-up spools are provided with relatively large hubs 15 so that the linear velocity of the wire varies by only a small amount during transfer of the entire length of wire from one spool to the other with constant angular velocity for the take-up spool. Means may be provided if desired to vary the angular velocity of the spools so as to preserve entirely a constant linear speed for the wire.

Fig. 2 shows a side elevation of the magnetic head 5, the plane of Fig. 2 being perpendicular to the plane of Fig. 1. The wire 7 is seen in section riding on the two pole pieces generally indicated at 17 and 19 of the head. As better seen in Fig. 3 the pole pieces overlap each other in the plane of Fig. 2 so as to provide confronting pole faces perpendicular to the direction of wire travel. The head of Fig. 2 may of course be surrounded by a conventional housing for its protection against the elements. The head may be made up of a number of ferromagnetic laminations forming a magnetic circuit substantially closed except for two nonmagnetic gaps closely spaced together in the region of wire contact. The head of Fig. 2 includes two L-shaped laminations 20 and 21, a U-shaped lamination 23, and additional laminations in the region of the wire contact. The short portions of the L's extend into pole tips 17 and 19 (see Fig. 3), and the upright portions provide, in conjunction with the U-shaped lamination 23, a ferromagnetic circuit extending in a closed path from the pole tip 17 to the pole tip 19. The laminations 20, 21 and 23 are bonded together in intimate physical contact by appropriate means. The recording and playback winding 25 may be wound upon one or both of the vertical portions of the L's as shown in Fig. 2.

Referring now to Fig. 3 and to the enlargement thereof in Fig. 4, the construction of the pole tips of the assembled head and the main and auxiliary nonmagnetic gaps will be seen in more detail.

In order to provide the pole tips with an appropriate dimension lengthwise of the wire travel for contact between the wire and the pole tips in accordance with my invention as will be more fully described below, additional short laminations 27 are bonded to the short horizontal portions of the laminations 20 and 21. Thus the distance along which the wire makes contact with the pole tips 17 and 19 and hence their length in the direction of wire travel, includes the thickness of the laminations 27 as well as that of the laminations 20 and 21.

The confronting pole tips 17 and 19 overlap in the plane of Fig. 2 by a distance adequate to provide a path for the wire travel perpendicular to the laminations and in contact with both pole tips. The pole tips are kept from ferromagnetic contact with each other by two spacers 30 and 31 of nonmagnetic material.

The spacers 30 and 31 are disposed on either side of a ferromagnetic lamination 33, which is insulated magnetically thereby both from the lamination 21 of the pole tip 19 and the lamination 20 of the pole tip 17. The lamination 33 may be of the same area and thickness as the laminations 27 and is mechanically affixed with the spacer 31 to the lamination 20 so as to form a part of the pole tip 17. The spacers 30 and 31 may be of equal thickness, but they introduce into the magnetic circuit nonmagnetic gaps of unequal reluctance because of large differences between the areas of confronting magnetic laminations which they respectively separate. The main nonmagnetic gap in the magnetic circuit of the head is introduced by the spacer 30, and the auxiliary gap is introduced by the spacer 31.

The relation of the laminations is further shown in end elevation view of Fig. 5 where the supplementary lamination 33 may again be seen interposed between the adjacent pole faces.

The performance in the recording system of Fig. 1 of the magnetic head of Fig. 2 will now be described in terms of the performance of a specific example. A magnetic head of the type shown in Figs. 2–5 was constructed possessing the following important dimensions:

Length of each pole tip in the direction of wire travel (exclusive of the ferromagnetic lamination between the nonmagnetic gaps)—0.055 in.;

Thickness of the ferromagnetic spacing lamination between the gaps—0.014 in.;

Length of gaps in the direction of wire travel—0.001 in.

The location of these dimensions is shown in Fig. 10.

The head of Fig. 10 was mounted in a recording system of the type illustrated in Fig. 1 and a series of recordings of signals of different frequencies was made on a stainless steel wire .004 in. in diameter moving at a speed of approximately 2 ft. per second. The R. P. M. value of current through the recording coil was held constant for all frequencies. The recording coil carried a supersonic bias signal in addition to the audio frequency signal to be recorded. The recordings were subsequently played back at the same speed, and the output from the terminals of the pick-up coil was measured on a decibel meter. Setting the response at 1000 cycles equal to an arbitrary zero power level, the response at other frequencies is shown in curve A of Fig. 6.

It is not believed however that it is essential to the effective operation of the magnetic head of this invention that it be used for the recording of the signals to be played back. The peculiar advantages of the head relative more especially to playback and the way in which the magnetic flux imposed upon the wire during the process of recording is brought into effective relation with the pick-up coil during playback. All that is required therefore for an effective demonstration of the head is a series of recordings made with constant current, whether with a head of this type or not.

The voltages at the terminals of the pick-up coil required to produce the response shown in curve A of Fig. 6 were computed and the ratio of these voltages to frequency is shown as a function of frequency as curve B in Fig. 6. This may be contrasted with the constant value which this ratio should possess at all frequencies in order to reflect the linear relation between voltages and frequencies assumed in the prior art and required to fulfill the 6 db per octave improvement in frequency response. This 6 db characteristic is in fact observed at least in the lower range of frequencies with conventional playback heads in which the wire makes contact with the pole tips only at the gap itself. The curve of constant voltage-frequency ratio vs. frequency is plotted as curve C of Fig. 6 and is flat up to a frequency of about 1200 cycles where the self-demagnetization of the wire and the customary gap effect introduce a fall in the rate of increase of voltage.

The difference between curves B and C is plotted as curve D in Fig. 6 and provides an indication of the improvement in low frequency response achieved with the head of the present invention. Curve D presents a sharp rise in the neighborhood of 100 cycles and a less sharp but a significant minimum in the neighborhood of 1000 cycles in the neighborhood of the point of maximum frequency response expectable for heads of the prior art having a similar physical gap length.

The salient properties of the response curve A of Fig. 6 and of the curve D which suggests reasons for the superiority of curve A are thus a greatly improved response in the vicinity of 120 cycles, at which frequency the linear length of a recorded wave along the wire approaches twice the length of the head in the direction of wire travel, and a lesser but significant attenuation in the vicinity of 1000 cycles, at which frequency the linear length of a recorded wave along the wire is slightly more than twice the separation of the main and auxiliary gaps. The need for auxiliary amplifying circuits to provide bass boost at the frequencies where traditional magnetic recording equipment performs inadequately is avoided or substantially reduced and at the same time the peak associated with the middle range of audio frequencies is reduced.

The recording system of the example just described is characterized by a relation between wire speed and the dimensions of the pole tips with which wire made contact during playback, such that at frequencies in the neighborhood of 120 C. P. S. the wire lies in contact with each pole tip for a distance approximately equal to one-quarter of the linear length along the wire of a recorded wave of such frequency. It is also characterized by a separation of the main and auxiliary gaps approximately equal to one-half the length of a recorded wave at frequencies in the neighborhood of 1000 cycles per second.

It is believed that the superiority of the low frequency response of this head, and of others built and operated on the same principles may be explained in the following terms. The explanation given herewith, while believed to be correct, does not form a part of my invention, and my invention is not limited thereto.

Referring to Fig. 7, the equivalent magnetic circuit of the head of the previously described example is shown in the region of the pole tips thereof. The horizontal dimensions are properly scaled to the magnitudes shown and to the linear length of recorded waves along the wire corresponding to 120 cycle signals recorded at a wire speed of two feet per second. The vertical dimensions are arbitrary, in particular the thickness of the wire 50 is exaggerated. The magnetic head of Fig. 7 comprises two substantially homogeneous ferromagnetic pole tips generally indicated at 52 and 54 whose lengths in the direction of travel of the wire 50 are each 0.055 in. The top surfaces and the pole tips are smooth and substantially coplanar so that the wire 50 in passing over the head makes continuous contact with the pole tips except over the main gap 60 and auxiliary gap 62. The main and auxiliary gaps are separated by ferromagnetic lamination 64 having a dimension in the direction of the wire travel of 0.014 in. While the main and auxiliary gaps both have a length in the direction of wire travel approximating 0.001 in., the main gap has a reluctance many times that of the auxiliary gap in view of the small area of the pole tip 52 which confronts the spacing lamination 64. At a wire speed of two feet per second, the linear length along the wire of a complete cycle of a signal having a frequency 120 cycles per second amounts to approximately 0.2 in. Accordingly half a wave length, having a length of 0.1 in., extends somewhat less than the full length of the head, which is approximately 0.126 in. in length in the direction of wire travel. The wire 50 is shown with one of the elementary magnets forming half of a recorded wave at this frequency disposed on the head with the north and south poles thereof adjacent the edges of the pole tips remote from the gaps. A possible configuration of the external flux lines is shown in the figure and it is apparent that there exists through the length of this elementary magnet, except between the main and auxiliary gaps, a low reluctance iron contact path between the material of the wire and the pole tips. In consequence, all or nearly all of the external flux belonging to this elementary magnet may be expected to traverse the magnetic circuit of the head, threading the pick-up coil 57. It is apparent also that flux originating at points in the wire past the ends 55 and 56 of the head contribute also to the total flux threading the pick-up.

For frequencies below 120 C. P. S., the pole tips of the head no longer possess an effective length as great as a quarter of the linear length of a recorded wave along the wire and the number of flux lines having an iron contact path with the material of the pole tips is reduced, with a consequent fall in the number of flux lines threading the pick-up coil. The fall in the response curve A of Fig. 6 at frequencies below 120 C. P. S. is rendered plausible in terms of this analysis.

As the frequency of the recorded signal rises the linear length of a recorded wave declines in proportion to the fixed length of the playback head. By the length of the playback head is meant the length along which the wire makes contact with the head during playback. When the frequency rises from that for which the linear length of half a recorded wave approaches the length of the head to that for which the linear length of half a recorded wave approximates one-third the length of the head, three elementary magnets instead of one lie in contact with the head, as shown in Fig. 8. Fig. 8 is similar to Fig. 7 except that the frequency of the signal recorded on the wire lying on the head is approximately 300 C. P. S. instead of 100 C. P. S. $M_2$, one of the three elementary magnets, $M_1$, $M_2$ and $M_3$ of Fig. 8, bridges both the main and auxiliary gaps 60 and 62 whose separation at this frequency is still small compared to the length of the magnet $M_2$. The external flux lines of the magnet $M_2$ diverge from the poles at the ends of this magnet and enter the pole tips 52 and 54 to link the pick-up coil 57 and contribute to the signal on playback. Of the other two elementary magnets one, designated $M_1$, is in contact throughout its length with the pole tip 54 and the other, $M_3$, is in contact throughout its length with the pole tip 52. The external flux from the magnets $M_1$ and $M_3$ is therefore short circuited by the pole tips 54 and 52 respectively and none of this flux links the pick-up coil. There is consequently very little additive effect and the head performs much like the conventional head in which the wire makes contact with the pole tips only at the very edges of the gap.

Reference to the position of curve B of Fig. 6 at a frequency of 300 C. P. S. shows that in the example above described the response on playback at 300 C. P. S. was in fact sensibly the same as that predicted by the accepted theory for conventional heads. The additive effect upon the flux linking the pick-up coil on playback which is displayed by the head of my invention when the ratio of half length of a recorded wave to the head length approaches unity, combined with the lack of such additive effect when the ratio approaches one-third, produces a substantially flat response (curve A of Fig. 6) between the frequency appromixately 100 C. P. S. and 300 C. P. S.

At higher frequencies, where the customary 6 db response curve continues to climb, the auxiliary gap of the head of my invention cuts down the response by adding a series reluctance to that encountered by the flux from the elementary magnet bridging the main gap. The frequency at which the auxiliary gap becomes effective for this purpose is determined by the separation of the two gaps in terms of the half wave length of recorded waves. When the frequency rises until half the length of a recorded wave is no longer sufficient to bridge both gaps, the reluctance of the auxiliary gap is placed in the path of the flux lines emanating from the elementary magnet, which now bridges the main gap only. The spacing of the two gaps may advantageously be made approximately one-tenth of the total length of the head in the direction of wire travel. In the example above described the thickness of the spacing lamination 64 of Figs. 7 and 8, amounts to 0.014 in., or slightly more than one-tenth of the total length of 0.126 in. possessed by the head in the direction of wire travel. This provides a separation between the main and auxiliary gaps which, for a wire speed of two feet per second, will be bridged by a half wave length (i. e. by one elementary magnet) of recorded signals of frequencies below 600 C. P. S. Signals of this frequency and below are substantially unaffected on playback by the auxiliary gap. For higher frequencies however, as appears from curve D of Fig. 6, the auxiliary gap results in a reduction in response below that exhibited by conventional heads having a single gap.

The relation between the elementary magnets and the head for a frequency of 1000 C. P. S. is illustrated in Fig. 9. The elementary magnet corresponding to one-half of a recorded wave is still long by comparison with the main gap 60, so that the magnet enjoys a low reluctance contact with the head along substantially its entire length, but the auxiliary gap 62 reduces the contribution which this magnet makes to the signal induced in the pick-up coil. This is seen in curve A of Fig. 6 where the response at 1000 C. P. S. is substantially equal to that at 100 C. P. S. At frequencies very much higher, above 2000 or 3000 C. P. S., the self-demagnetizing effect of the wire and the reduction in available contact area between the portions of the magnet bridging the main gap and the pole tips over-shadow the contribution of the auxiliary gap.

The length of the pole tips and the separation of the main and auxiliary gaps of the head of my invention may be separately dimensioned respectively to favor and to discriminate against other frequencies than those cited in the example described. Frequencies in the region of 120 C. P. S. are of interest because of the characteristics of the human ear, which requires reproduction of frequency components at least down to such frequencies in order to experience the illusion of faithful reproduction. Similarly, the 1000 C. P. S. frequency for which the auxiliary gap spacing of the example was described, is partly arbitrary and partly a choice of a middle frequency required for intelligible reproduction of speech which is exaggerated in playback by the conventional heads of the prior art.

Substantial improvement in low frequency may also be obtained according to my invention by building out only one instead of the two pole tips, so that the record medium will contact one of the pole tips for a substantial continuous distance, while contacting the other pole tip for a very short distance only. Thus in the construction described with reference to Figs. 3 and 4, additional laminations 27 may be supplied to only one of the pole pieces 17 and 19. Or the separate pole pieces may be constructed to provide substantial but unequal lengths of contact path, so that one pole piece favors one frequency and the other a frequency slightly removed.

The dimensioning of the pole tips and the introduction of an auxiliary gap spaced at a chosen distance from the main gap are separate features and heads may be constructed to include either one or both.

The arrangement of the elements of the head described is illustrative of my invention only. My invention comprehends all variations and modifications of the structure and method hereinbefore described which fall within the scope of the appended claims.

I claim:

1. In magnetic sound record equipment, a magnetic sound head comprising a plurality of ferromagnetic laminations bonded together in magnetic contact and forming a magnetic core of substantially rectangular shape with the planes of the laminations substantially parallel to the plane of the rectangle, one of the sides of the rectangle being split athwart the core to provide a nonmagnetic gap, the portions of the said side overlapping each other in the plane of the rectangle adjacent the gap, a nonmagnetic spacer in the said gap magnetically insulating the said portions from each other, and a nonmagnetic lamination interposed between two of the ferromagnetic laminations of one of the said portions so as to insulate magnetically the ferromagnetic lamination of the said portion adjacent the gap from the other ferromagnetic laminations of the said portion.

2. In magnetic sound record equipment, a magnetic sound head comprising a ferromagnetic core forming a magnetic circuit closed except for two closely spaced nonmagnetic gaps, two laterally confronting pole tips formed on said core and each terminated at one of the said nonmagnetic gaps, a ferromagnetic body disposed between the said nonmagnetic gaps, and a winding disposed about the core.

3. In magnetic sound record equipment, a magnetic sound head comprising a ferromagnetic core having laterally confronting pole pieces with a first nonmagnetic gap therebetween, a second nonmagnetic gap in the core disposed across one of the pole pieces adjacent the first nonmagnetic gap, and a winding disposed about the core.

4. In magnetic sound record equipment, a magnetic head comprising a core of ferromagnetic material forming a magnetic circuit of substantially rectangular shape, a gap in the core disposed in one side of the rectangle, the two portions of the said side on either side of the gap overlapping each other substantially in the plane of the rectangle, the overlapping portions of the said one side being magnetically insulated from each other, one of the said portions being further split in the plane of the rectangle to provide a lamination of ferromagnetic material coextensive with the area of the said portion and adjacent the said gap, and a lamination of nonmagnetic material interposed between the said ferromagnetic lamination and the remainder of the said one portion.

5. In magnetic sound record equipment, a magnetic sound head comprising a ferromagnetic core made up of substantially parallel thin laminations, the said core having two laterally confronting pole pieces separated by a nonmagnetic gap, a ferromagnetic lamination disposed in the said gap between the said pole pieces and magnetically insulated from the said pole pieces, and a winding disposed about the core.

HERMAN NYGAARD.

REFERENCES CITED

The following references are of record in the file of this patent:

UNITED STATES PATENTS

| Number | Name | Date |
|---|---|---|
| 1,828,190 | Killiani | Oct. 20, 1931 |
| 2,003,968 | Hickman | June 4, 1935 |
| 2,144,844 | Hickman | Jan. 24, 1939 |
| 2,300,320 | Swartzel | Oct. 27, 1942 |
| 2,325,844 | Fischer | Aug. 3, 1943 |
| 2,351,006 | Camras | June 13, 1944 |
| 2,431,540 | Camras | Nov. 25, 1947 |
| 2,433,207 | Eilemberger | Dec. 23, 1947 |
| 2,459,299 | West | Jan. 18, 1949 |
| 2,475,421 | Camras | July 5, 1949 |
| 2,479,308 | Camras | Aug. 16, 1949 |
| 2,488,717 | Eilemberger | Nov. 22, 1949 |

FOREIGN PATENTS

| Number | Country | Date |
|---|---|---|
| 617,796 | Germany | Aug. 28, 1935 |
| 805,434 | France | Nov. 19, 1936 |
| 881,343 | France | Apr. 21, 1943 |

OTHER REFERENCES

Electronics, pages 126–135, July, 1945.